(12) United States Patent
Nishi

(10) Patent No.: US 7,187,381 B2
(45) Date of Patent: Mar. 6, 2007

(54) APPARATUS FOR DRAWING DOTTED LINES HAVING NATURAL APPEARANCE

(75) Inventor: Hidefumi Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 10/097,374

(22) Filed: Mar. 15, 2002

(65) Prior Publication Data

US 2002/0186219 A1    Dec. 12, 2002

(30) Foreign Application Priority Data

Jun. 7, 2001    (JP) .............................. 2001-172920

(51) Int. Cl.
*G06T 11/20*    (2006.01)
(52) U.S. Cl. .................................... 345/443
(58) Field of Classification Search ................ 345/443, 345/421, 441
See application file for complete search history.

(56) References Cited

U.S. PATENT DOCUMENTS

| | | | | |
|---|---|---|---|---|
| 5,276,790 A | * | 1/1994 | Lo et al. ..................... | 345/442 |
| 5,303,340 A | * | 4/1994 | Gonzalez-Lopez et al. . | 345/441 |
| 5,396,584 A | * | 3/1995 | Lee et al. .................... | 345/589 |
| 5,487,142 A | * | 1/1996 | Nakayama et al. ......... | 345/443 |
| 5,555,358 A | * | 9/1996 | Blumer et al. .............. | 345/441 |
| 5,680,560 A | * | 10/1997 | Gaertner ...................... | 715/764 |
| 6,297,828 B1 | * | 10/2001 | Fukuzawa ................... | 345/443 |
| 6,570,562 B1 | * | 5/2003 | Myers ......................... | 345/418 |
| 6,674,430 B1 | * | 1/2004 | Kaufman et al. ........... | 345/419 |
| 6,882,444 B1 | * | 4/2005 | Nishi .......................... | 358/1.9 |
| 2001/0028350 A1 | * | 10/2001 | Matsuoka et al. .......... | 345/427 |

FOREIGN PATENT DOCUMENTS

| | | |
|---|---|---|
| JP | 2-222079 | 9/1990 |
| JP | 3-83183 | 4/1991 |

OTHER PUBLICATIONS

Making the DDA run: Two-dimensional ray traversal using runs and runs of runs. Peter Stephenson and Bruce Litow, pp. 177-183, IEEE 2001.*
Automatic Illustration of 3D Geometric Models : Lines Debra Dooley and Michael F . Cohen University of Utah, Department of Computer Science, 1990 ACM.*
James D. Foley et al. "Computer Graphics: Principles and Practice" 2nd edition in C, Chapter two, pp. 25-66.*

(Continued)

*Primary Examiner*—Kee M. Tung
*Assistant Examiner*—J. Amini
(74) *Attorney, Agent, or Firm*—Staas & Halsey LLP

(57) ABSTRACT

An apparatus includes a memory which stores therein data of a dotted-line pattern, a unit which identifies successive pixels on a straight line to be drawn with respect to each line of a plurality of straight lines that are drawn side by side, a pattern reference unit which refers to the data of a dotted-line pattern while changing a reference address for accessing the memory in accordance with a slope of a dotted line to be drawn, and a drawing unit which draws the successive pixels in response to the data of a dotted-line pattern referred to by the pattern reference unit.

10 Claims, 8 Drawing Sheets

OTHER PUBLICATIONS

Machine interpretation of CAD data for Manufacturing Applications, Qiang JI and Michael M. Marefat, ACM Computing Surveys vol. 24, No. 3 1997.*

Drawing Graphs methods and Models , Kaufmann Wagner (Eds), 1998, pp. 247-267; ISBN 3-540-42062-2; www.springer.de.*

Running the line: Line drawing using runs and runs of runs, Bruce Litow and Peter Stephenson, 2001, pp. 681-690.*

Fast Lines: a Span by Span Method, V. Boyer and J.J. Bourdin; Eurographics 1999, vol. 18, No. 3.*

E. J. Lee and L. F. Hodges, Run Based Multi-point Line Drawingl 1993.*

P. Stephenson and B. Litow, *Making the DDA run: Two-dimensional ray traversal using runs and runs of runs. Peter Stephenson; Bruce Litow. Feb. 2001. 23(1). 177-183.*

P. Stephenson. The Structure of the Digitised Line: With Application to Line Drawing and Ray Tracing in Computer Graphics, PhD Thesis. James Cook University of North Queensland, Australia 1998.*

J. D. Foley. A. Van Dam, S. K. Feiner, J. F. Hughes; Computer Graphics: Principles and Practice, Second Edition in C, Addison-Wesley. 1990. pp. 72-83.*

* cited by examiner

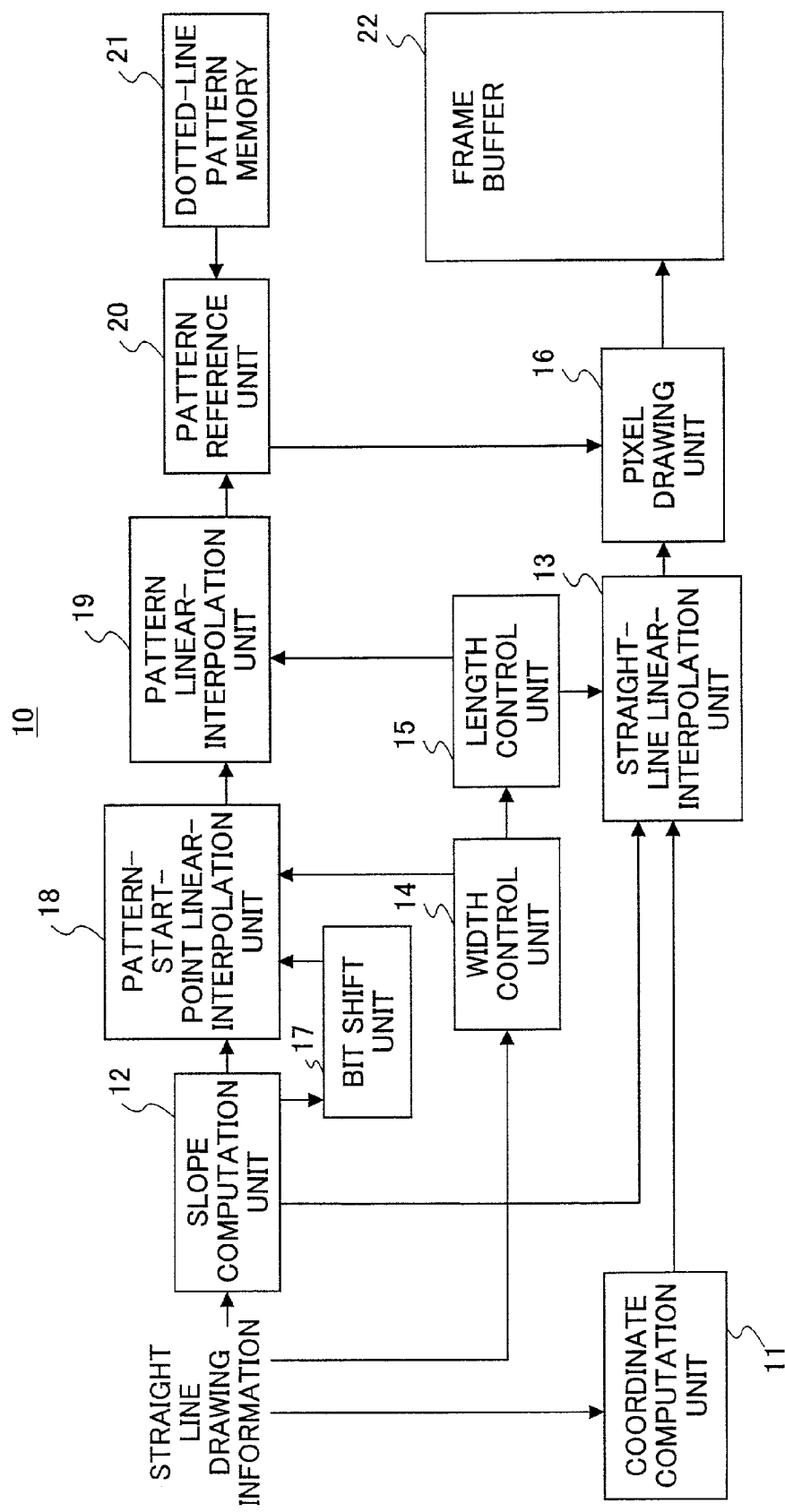

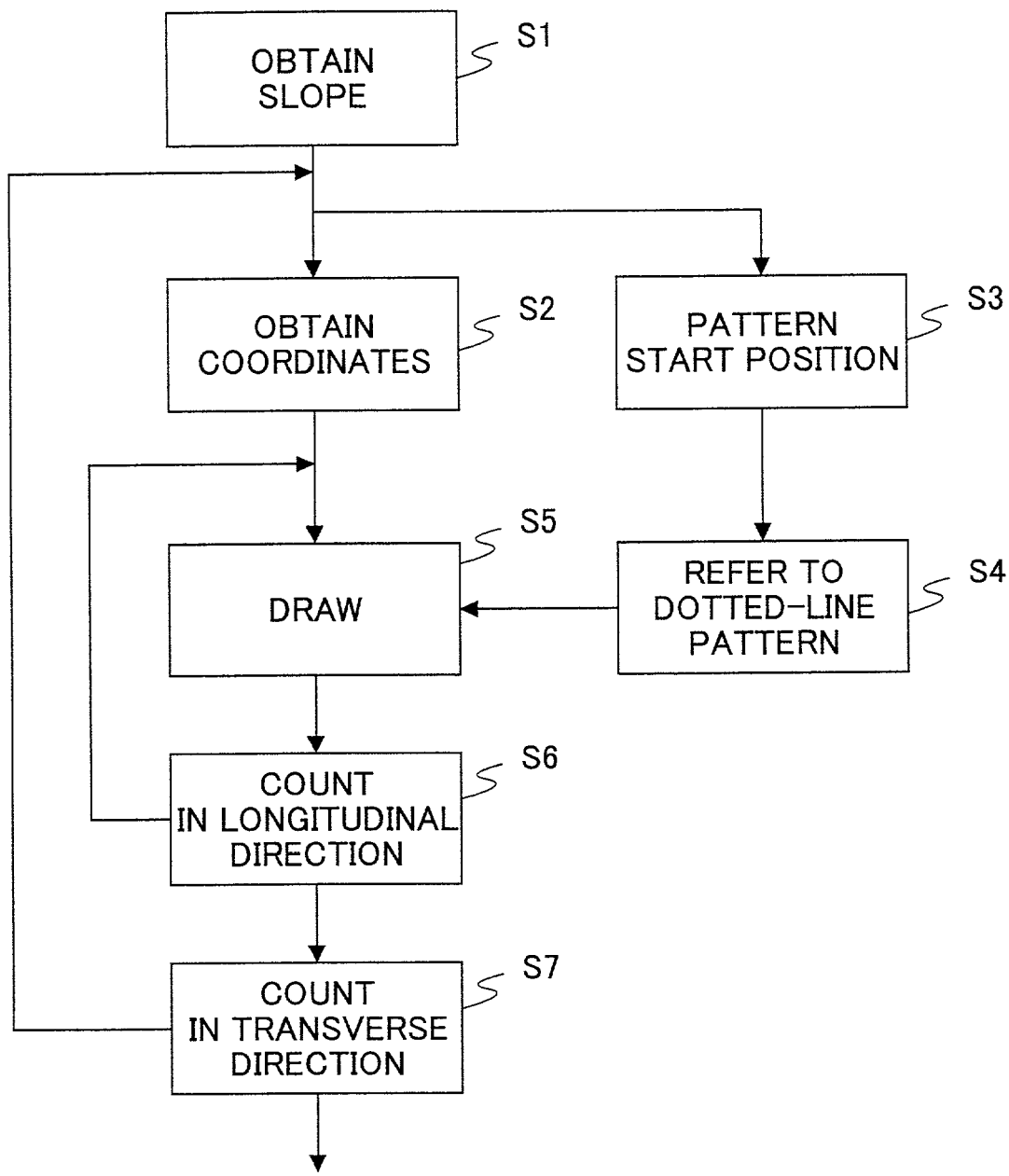

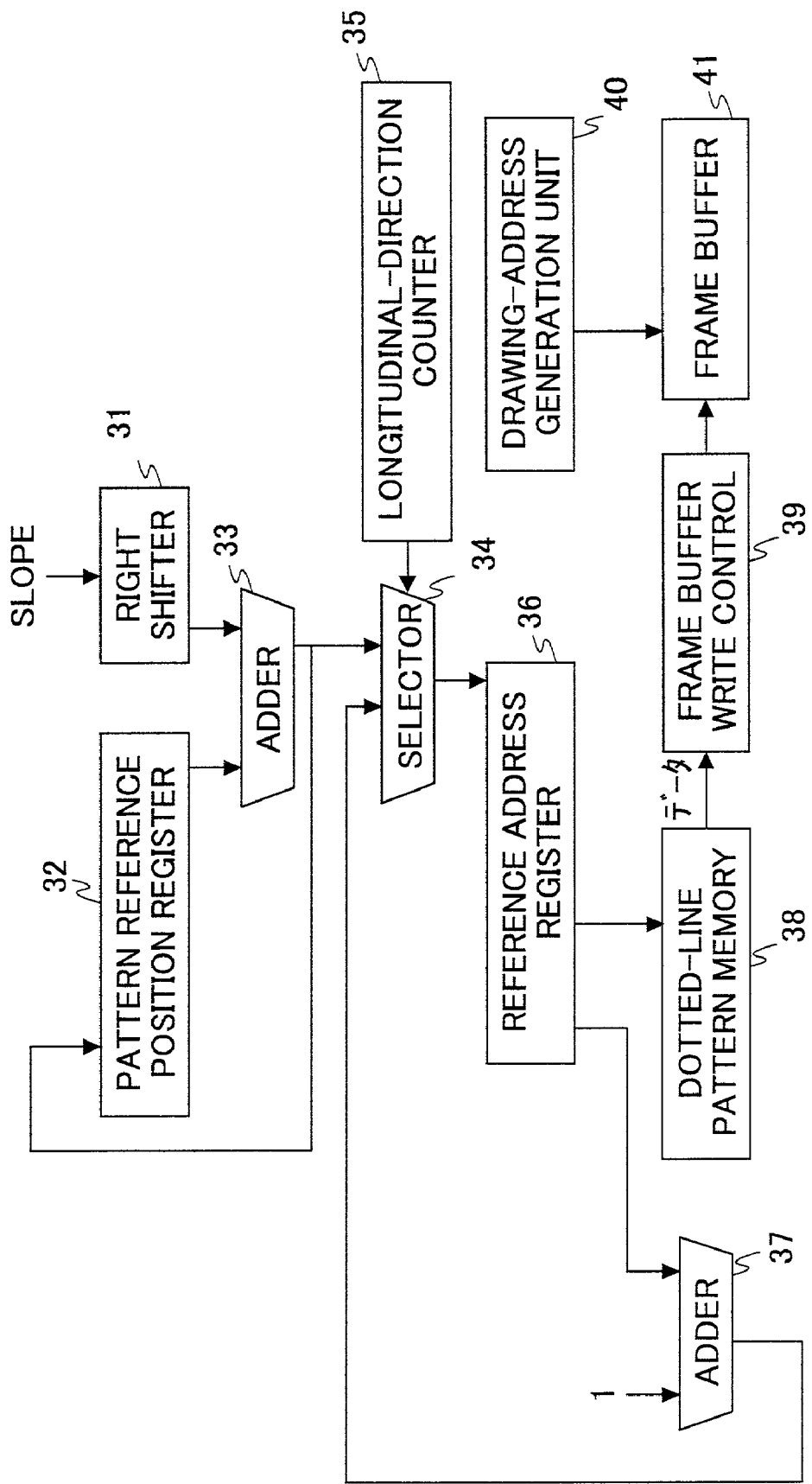

APPARATUS FOR DRAWING DOTTED LINES HAVING NATURAL APPEARANCE

BACKGROUND OF THE INVENTION

1. Field of the Invention

The present invention generally relates to image drawing apparatuses that draw images on display screens, and particularly relates to an image drawing apparatus that is equipped with a function to draw dotted lines.

2. Description of the Related Art

Apparatuses for drawing images and pictures on computer display screens are equipped with various drawing tools, one of which is a function to draw a dotted line of a specified type. Data of a dotted line represents the drawing/skipping of each dot by data "1" and "0", respectively. Based on this data, dots are drawn in response to data "1", and are not drawn in response to data "0", thereby drawing a dotted line.

In related-art dotted-line drawing apparatuses, a thick dotted line is made by drawing identical dotted lines with a horizontal shift by one pixel successively made to each line, or by drawing identical dotted lines with a vertical shift by one pixel successively made to each line. In the related-art dotted-line drawing apparatuses, therefore, broken edges of a thick dotted line extend in the horizontal direction or the vertical direction in the frame buffer regardless of the orientation of the doted line. When a thick dotted line at 45 degrees (relative to the horizontal line) is drawn, the orientation of the line is 45 degrees, but the broken edges of the dotted line end up extending in the horizontal direction or the vertical direction. If the dotted line is a 45-degree line lifted on the right, for example, the broken edges of the dotted line should form a 45-degree line lifted on the left in order to provide natural appearance.

In this manner, the related-art dotted-line drawing apparatuses have a problem in that a thick dotted line ends up having unnatural appearance. In order to provide proper broken edges to the dotted lines, some of the related-art technologies use a method that draws dotted lines by combining basic figures such as triangles and rectangles. Such a method requires a large amount of computation, results in a lengthy processing time and an increase in apparatus size.

Accordingly, there is a need for a dotted-line drawing apparatus that can draw a thick dotted line having natural appearance through simple computation.

SUMMARY OF THE INVENTION

It is a general object of the present invention to provide a dotted-line drawing apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a dotted-line drawing apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an apparatus according to the present invention includes a memory which stores therein data of a dotted-line pattern, a unit which identifies successive pixels on a straight line to be drawn with respect to each line of a plurality of straight lines that are drawn side by side, a pattern reference unit which refers to the data of a dotted-line pattern while changing a reference address for accessing the memory in accordance with a slope of a dotted line to be drawn, and a drawing unit which draws the successive pixels in response to the data of a dotted-line pattern referred to by the pattern reference unit.

The apparatus described above successively shifts a pattern reference position according to the slope when drawing a plurality of dotted lines to generate a thick dotted line. This makes it possible to properly adjust the direction of broken edges of the dotted line in relation to the direction at which the dotted line extends, thereby generating a dotted line having natural appearance.

According to one aspect of the present invention, the apparatus as described above is such that the pattern reference unit refers to the data of a dotted-line pattern by determining a reference address of a start point of line drawing as being specific to each line of the plurality of straight lines according to the slope and by successively shifting the determined reference address by one address.

In the apparatus described above, the pattern reference position of a start point of line drawing is successively shifted according to the slope when drawing a plurality of dotted lines to generate a thick dotted line. This makes it possible to properly adjust the direction of broken edges of the dotted line in relation to the direction at which the dotted line extends.

According to another aspect of the present invention, the pattern reference unit refers to the data of a dotted-line pattern by starting from a reference address of a start point of line drawing that is shifted one by one each time a new line of the plurality of straight lines is to be drawn, and by successively shifting the reference address according to the slope.

In the frame buffers, it is generally faster to draw lines by scanning in the horizontal direction than drawing lines by scanning in the vertical direction. In the case of drawing a doted line having a vertical principal axis, it is desirable to draw straight lines extending in the horizontal direction that have a length corresponding to a specified line width, rather than drawing straight lines extending in the vertical direction that is a principal axis. This improves the speed at which a line is drawn in the frame buffer. When drawing a plurality of dotted lines having a vertical principal direction to generate a thick dotted line, the apparatus as described above successively draws horizontal lines to achieve high-speed drawing, and successively shifts the pattern reference position of each pixel on the current horizontal line in accordance with the slope. This makes it possible to properly adjust the direction of broken edges of the dotted line in relation to the direction at which the dotted line extends, thereby generating a dotted line having natural appearance.

Other objects and further features of the present invention will be apparent from the following detailed description when read in conjunction with the accompanying drawings.

BRIEF DESCRIPTION OF THE DRAWINGS

FIG. 2 is a block diagram showing a configuration of a first embodiment of an image drawing apparatus according to the present invention;

FIG. 3 is a flowchart showing a method of drawing a doted line performed by the image drawing apparatus of FIG. 2;

FIG. 4 is a block diagram showing a configuration of a portion of the image drawing apparatus of FIG. 2 that relates to the control of pattern reference positions;

DESCRIPTION OF THE PREFERRED EMBODIMENTS

Figure 1A:
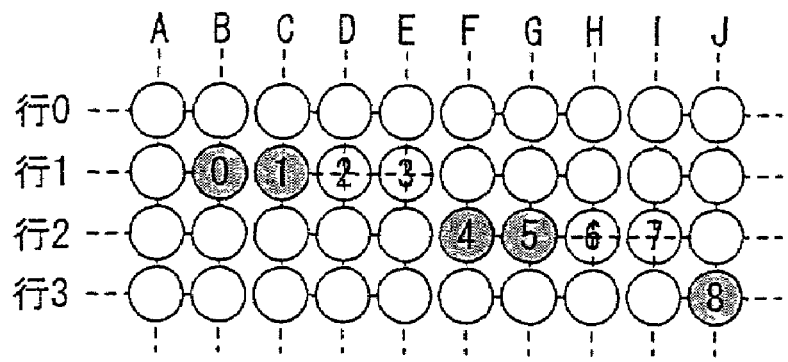
FIG. 1A is an illustrative drawing showing pixels after a first dotted line is drawn according to a dotted-line drawing method of the present invention.

In the following, embodiments of the present invention will be described with reference to the accompanying drawings.

Dotted-line data (indicative of the drawing/skipping of each pixel) for a predetermined number of pixels is stored as a dotted-line pattern in a dotted-line pattern storage. At the time of drawing a line (dotted line), the dotted-line data is retrieved from the dotted-line pattern storage each time a pixel is drawn, and the control of drawing is carried out in accordance with the retrieved dotted-line data. The dotted-line pattern includes a data series of data 0, data 1, data 2, and so on as dotted-line data for the predetermined number of pixels, and the value of each data piece indicates an on/off state (drawing/skipping) of a corresponding pixel. When a dotted line is to be drawn, successive pixels on a straight line are controlled as to the on/off state thereof based on the dotted-line data while a scan on the XY address plane is made along successive pixels on the straight line. In the description that follows, therefore, the term "straight line" is used to represent a straight line in general inclusive of a dotted line.

When a thick line is to be generated, a plurality of straight lines are drawn side by side. The first line (e.g., the leftmost line) has a reference position of "0" within the dotted-line pattern at the start of drawing a dotted line, so that data 0 at address 0 corresponding to the reference position 0 is used as the first data for drawing. As each pixel is drawn on the straight line, the reference data is shifted from data 0 to data 1, from data 1 to data 2, and so on, and the drawing/skipping of each pixel is controlled based on the reference data. This aspect of the operation is the same as the related-art dotted-line drawing method. FIG. 1A is an illustrative drawing showing pixels after the first dotted line is drawn according to the dotted-line drawing method of the present invention.

After completing the drawing of the first line, a next line adjacent thereto will be drawn. At this time, the reference position within the dotted-line pattern is changed for the start point of line drawing, thereby adjusting broken edges of the dotted line so as to make them extend in a proper direction relative to the orientation of the dotted line. The change of the reference position within the dotted-line pattern is made as follows. A vertical length of the straight line to be drawn is denoted as $\Delta y$, a horizontal length of this straight line is denoted as $\Delta x$. If $\Delta y > \Delta x$ (i.e., the vertical direction is a principal axis), the slope of the straight line is computed as $\Delta y/\Delta x$. If $\Delta y < \Delta x$ (i.e., the horizontal direction is a principal axis), the slope of the straight line is computed as $\Delta x/\Delta y$. Half the slope obtained in this manner is added to the pattern reference position corresponding to the beginning of the straight line that has been drawn immediately before.

The reason why the slope is halved is that if the slope itself is used, proper broken edges cannot be produced depending on the orientations of dotted lines. Use of half the slope can produce proper broken edges, and all that is necessary for computation is to shift data to the right by one bit, which results in only a little increase in circuit size and complexity.

Figure 1B:
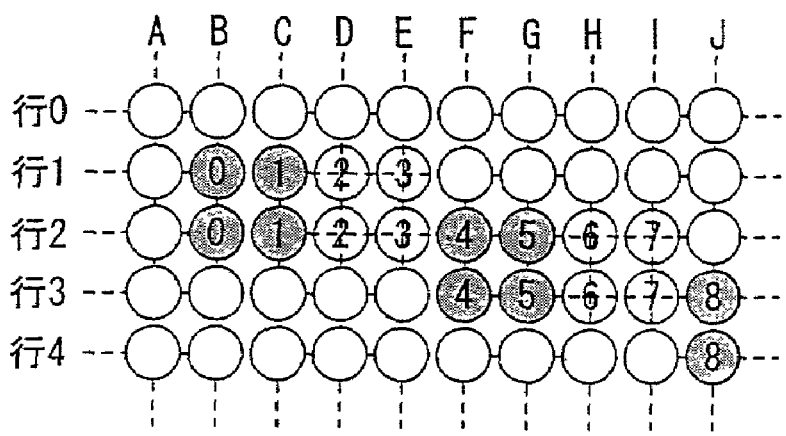
FIG. 1B is an illustrative drawing showing pixels after a second dotted line is drawn according to the dotted-line drawing method of the present invention.

If half the slope is 0.24, for example, the pattern reference position for the beginning of line drawing is 0.24 for the second dotted line. Since the pattern reference address needs to be an integer, the pattern reference position is rounded to the nearest integer, which is used as the pattern reference address for the beginning of line drawing. The reference pattern position inclusive of decimal digits is kept in storage to prepare for next line drawing. In the same manner as in the drawing of the first line, the pattern reference address is incremented by one address each time a pixel of the straight line is drawn. FIG. 1B is an illustrative drawing showing pixels after the second dotted line is drawn according to the dotted-line drawing method of the present invention.

Figure 1C:
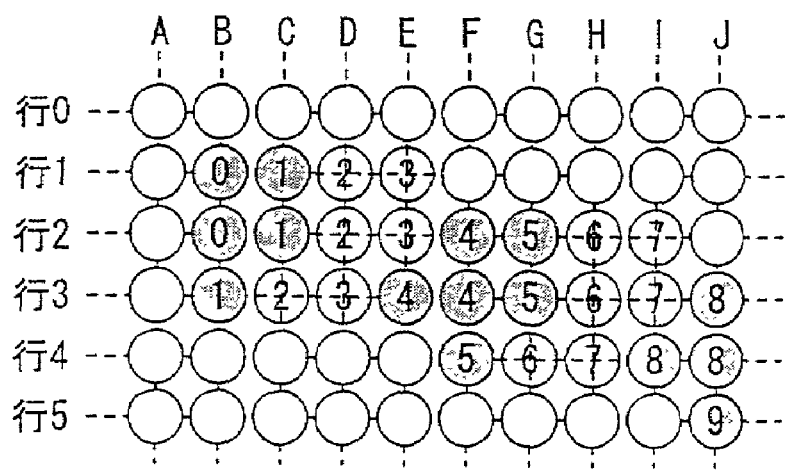
FIG. 1C is an illustrative drawing showing pixels after a third dotted line is drawn according to the dotted-line drawing method of the present invention.

The third line will be processed in the same manner, so that half the slope is added to the pattern reference position of the beginning of the immediately preceding line. As a result, the pattern reference position is set to $((slope)/2) \times 2$. This number is rounded to generate an address, which is used as the reference address of the beginning of line drawing. If half the slope is 0.24, the pattern reference position is 0.72 for the third line, which is rounded to a reference address of "1", so that drawing of the line starts from data 1 of the dotted-line pattern. FIG. 1C is an illustrative drawing showing pixels after the third dotted line is drawn according to the dotted-line drawing method of the present invention.

This procedure will be repeated to draw a desired number of dotted lines, so that the broken edges of the composite dotted line are properly slanted according to the slope of the straight line. Specifically, the broken edges have the direction thereof substantially at 90 degrees relative to the direction in which the straight line extends.

FIG. 2 is a block diagram showing a configuration of a first embodiment of an image drawing apparatus according to the present invention.

The image drawing apparatus 10 of FIG. 2 includes a coordinate computation unit 11, a slope computation unit 12, a straight-line linear-interpolation unit 13, a width control unit 14, a length control unit 15, a pixel drawing unit 16, a bit shift unit 17, a pattern-start-point linear-interpolation unit 18, a pattern linear-interpolation unit 19, a pattern reference unit 20, a dotted-line pattern memory 21, and a frame buffer 22.

Coordinates of a start point and an end point of a straight line to be drawn, a thickness of the straight line, etc., will be given as straight line drawing information. The coordinate computation unit 11 computes the coordinate addresses (i.e., an X address and a Y address) of a start point of a straight line based on the coordinates of the start point of the straight line to be drawn. The slope computation unit 12 computes the slope of the straight line to be drawn based on the coordinates of the start point and end point of the straight line. The straight-line linear-interpolation unit 13 adds incremental XY changes to the coordinate addresses of the start point of the straight line supplied from the coordinate computation unit 11 where the incremental XY changes match the slope of the straight line supplied from the slope computation unit 12. This provides XY addresses of successive points on the straight line to be drawn, thereby identifying pixels that reside on the straight line to be drawn.

The width control unit 14 counts the number of straight lines being drawn based on the drawing information about the thickness of the straight line to be drawn. Based on this count, the width control unit 14 makes the length control unit 15 operate a predetermined number of times, thereby drawing the predetermined number of straight lines side by side, generating a straight line of a predetermined width. The count information indicative of a current line in terms of how many lines have been drawn so far is supplied to the pattern-start-point linear-interpolation unit 18.

The length control unit 15 counts pixels up to the number that corresponds to the length of the straight line to be drawn under the control of the count given by the width control unit 14. The count of pixels is supplied to the straight-line linear-interpolation unit 13. According to this count, the straight-line linear-interpolation unit 13 adds incremental XY changes matching the slope of the straight line to the coordinate addresses of the start point of the straight line, thereby computing the XY addresses of successive pixels on the straight line to be drawn. The computed XY addresses of pixels on the straight line to be drawn are supplied from the straight-line linear-interpolation unit 13 to the pixel drawing unit 16.

The bit shift unit 17 receives slope data from the slope computation unit 12, and shifts the slope data to the right by one bit, thereby generating data of half the slope. This generated data is supplied to the pattern-start-point linear-interpolation unit 18.

The pattern-start-point linear-interpolation unit 18 outputs "0" as a pattern reference position of the start point of line drawing if the count supplied from the width control unit 14 indicates that the first line is to be drawn. If the count supplied from the width control unit 14 indicates that any one of the second and following lines is to be drawn, half the slope is added to the pattern reference position of the start point of previous line drawing each time the drawing of a new straight line is requested. The pattern reference position of a start point obtained in this manner is supplied to the pattern linear-interpolation unit 19.

The pattern linear-interpolation unit 19 successively adds 1 to the start-point pattern reference position in response to the pixel count supplied from the length control unit 15. The outcome of this addition operation is converted into an integer through a rounding operation such as rounding to the nearest integer or rounding by counting a fraction under the decimal point as one, and is then supplied to the pattern reference unit 20. Alternatively, the start-point pattern reference position may be rounded to an integer first, and, then, the successive addition of "1" may be carried out. The integer obtained in this manner corresponds to a reference address at which a data piece of the dotted-pattern data is retrieved. The pattern reference unit 20 reads a data piece of the dotted-line data from the specified reference address of the dotted-line pattern memory 21, and supplies the retrieved data to the pixel drawing unit 16.

The pixel drawing unit 16 performs drawing processing according to the dotted-line data supplied from the pattern reference unit 20 with respect to the pixel of specified XY addresses on the straight line supplied from the straight-line linear-interpolation unit 13. That is, the pixel of the specified XY addresses is drawn if the dotted-line data is "1", and is not drawn if the dotted-line data is "0".

In this manner, the image drawing apparatus 10 according to the present invention successively shifts the pattern reference position of a start point of line drawing in response to the slope when drawing a plurality of dotted lines to generate a thick dotted line. This makes it possible to properly adjust the direction of broken edges of the dotted line in relation to the direction at which the dotted line extends, thereby generating a dotted line having natural appearance.

FIG. 3 is a flowchart showing a method of drawing a doted line performed by the image drawing apparatus 10 of FIG. 2. A count in the transverse direction and a count in the longitudinal direction are initialized to zero.

At step S1, the slope of a straight line to be drawn is computed from the coordinates of the start point and end point of the straight line.

At step S2, the coordinate addresses (i.e., an X address and a Y address) of the start point are computed from the coordinates of the start point of the straight line to be drawn. The start-point coordinate addresses of the straight line to be drawn are shifted in accordance with the transverse direction count that identifies a current dashed line in terms of how many dashed lines have been drawn.

At step S3, the pattern reference position of a line drawing start point is set to "0" if the transverse-direction count is zero indicating that the first line is to be drawn. If the transverse-direction count is one or more indicating that any one of the second and following lines is to be drawn, half the slope is added to the pattern reference position of a start point of the preceding line drawing.

At step S4, the pattern reference position of a line drawing start point is converted into a reference address by a rounding operation such as rounding to the nearest integer, rounding to an integer by counting a fraction under the decimal point as one, etc. Data of the dotted-line pattern are successively read from successive reference addresses.

At step S5, incremental XY changes reflecting the slope are added to the previous coordinate addresses by starting from the start point in response to the longitudinal-direction count, thereby identifying a dot on the straight line to be drawn and performing drawing processing according to the dotted-line pattern data.

At step S6, the longitudinal-direction count is incremented by one, and thereafter the procedure goes back to step S5. If the longitudinal-direction count corresponds to the length of the straight line to be drawn, the drawing of a dotted line has come to an end, so that the procedure goes to step S7.

At step S7, the transverse-direction count is incremented by one, and the procedure goes back to step S2 and S3. If the transverse-direction count corresponds to the width of the straight line to be drawn, the drawing of all the dotted lines has come to an end, which marks an end of the image drawing procedure.

FIG. 4 is a block diagram showing a configuration of a portion of the image drawing apparatus 10 that relates to the control of pattern reference positions.

The configuration of FIG. 4 includes a right shifter 31, a pattern reference position register 32, an adder 33, a selector 34, the longitudinal-direction counter 35, a reference address register 36, an adder 37, a dotted-line pattern memory 38, a frame buffer write control 39, a drawing-address generation unit 40, and a frame buffer 41.

The right shifter 31 corresponds to the bit shift unit 17 of FIG. 2, and shifts the supplied slope data to the right by one bit so as to generate half the slope. The pattern reference position register 32 stores "0" therein as an initial value thereof. The adder 33 adds half the slope to the contents of the pattern reference position register 32, and stores an outcome of the addition operation in the pattern reference position register 32. This addition operation is performed each time the drawing of a new dotted line starts after completing the drawing of the previous dotted line. The pattern reference position register 32 and the adder 33 correspond to the pattern-start-point linear-interpolation unit 18 of FIG. 2.

The pattern reference position that is output from the adder 33 is supplied to the reference address register 36 through the selector 34 if the count of the longitudinal-direction counter 35 is "0". The reference address register 36 stores therein an integer value, and serves to hold an outcome of a rounding operation that rounds the supplied data of the pattern reference position to an integer. The address stored in the reference address register 36 is incremented by 1 by the adder 37, and is then supplied to the selector 34. If the count of the longitudinal-direction counter 35 is 1 or more, the selector 34 selects an outcome of the addition by the adder 37, and supplies the outcome of addition to the reference address register 36 each time the count increases. In this manner, the reference address is successively increased in response to the count of the longitudinal-direction counter 35 by starting from a reference address that corresponds to the pattern reference position. The longitudinal-direction counter 35 corresponds to the length control unit 15 of FIG. 2. Further, the selector 34, the reference address register 36, and the adder 37 correspond to the pattern linear-interpolation unit 19.

The reference addresses successively generated in this manner are supplied to the dotted-line pattern memory 38, thereby reading the dotted-line data one after another. The retrieved dotted-line data are supplied to the frame buffer write control 39. The frame buffer write control 39 performs drawing processing according to the supplied dotted-line data with respect to each pixel in the frame buffer 41 that corresponds to the drawing address supplied from the drawing-address generation unit 40.

In the following, a second embodiment of the present invention will be described.

In the frame buffers, it is generally faster to draw lines by scanning in the horizontal direction than drawing lines by scanning in the vertical direction. If $\Delta y > \Delta x$ where $\Delta y$ represents a vertical length of a straight line and $\Delta x$ represents a horizontal length of the straight line, it is desirable to draw straight lines extending in the horizontal direction that have a length corresponding to a specified line width, rather than drawing straight lines extending in the vertical direction that is a principal axis. This improves the speed at which a line is drawn in the frame buffer.

Figure 5A:
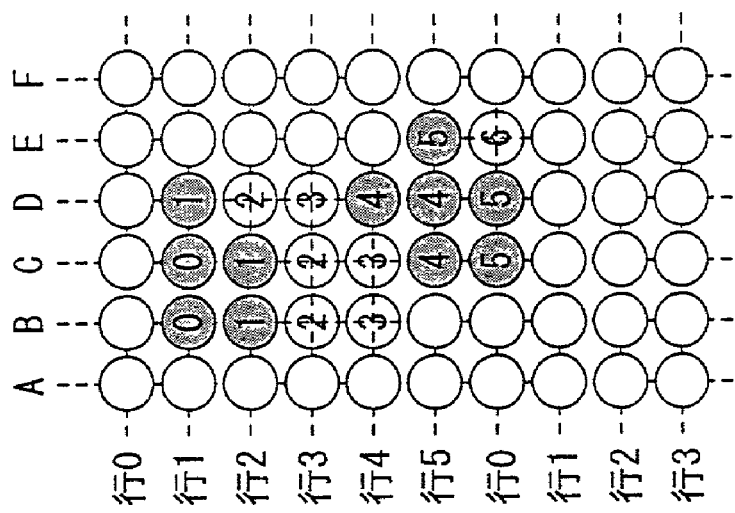
FIGS. 5A through 5C are illustrative drawings showing the way a straight line having a vertical principal axis is generated by drawing a plurality of horizontal lines.
Figure 5B:
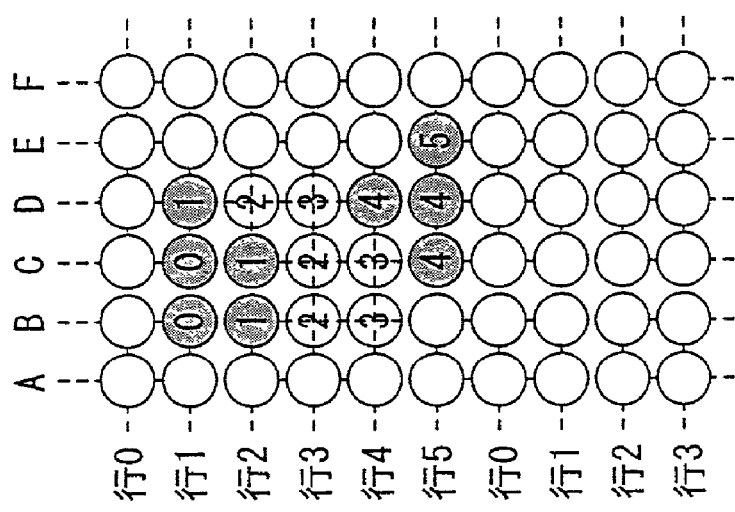
Figure 5C:
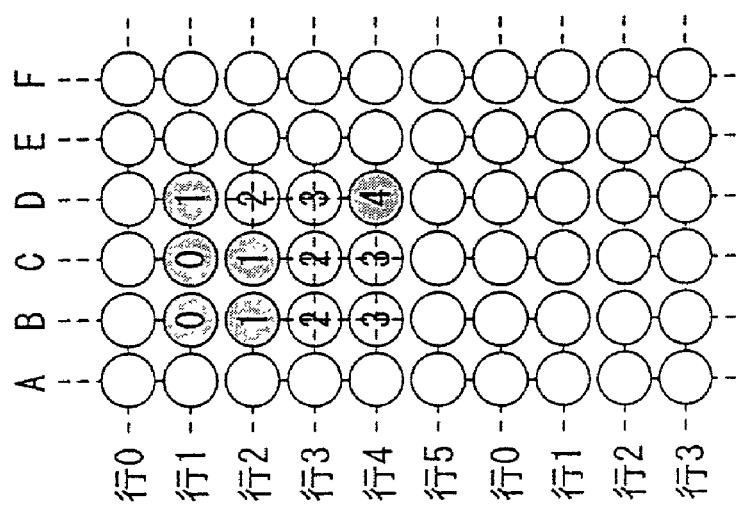

FIGS. 5A through 5C are illustrative drawings showing the way a straight line having a vertical principal axis is generated by drawing a plurality of horizontal lines.

As shown in FIGS. 5A through 5C, the pattern reference address of the start point of a horizontal line is 0 for the first horizontal line, and increases by one each time one horizontal line is drawn. That is, the dotted-line data that is used for the start point of a horizontal line is 0 for the first horizontal line, 1 for the second horizontal line, 2 for the third horizontal line, and so on.

When a horizontal line is drawn, $(\Delta x/\Delta y)/2$ is added to the pattern reference position each time the drawing of one pixel is completed, thereby changing the pattern reference position for the dotted-line pattern. The pattern reference position is rounded to an integer to generate a reference address, at which the dotted-line pattern is accessed for a corresponding pixel.

Figure 6:
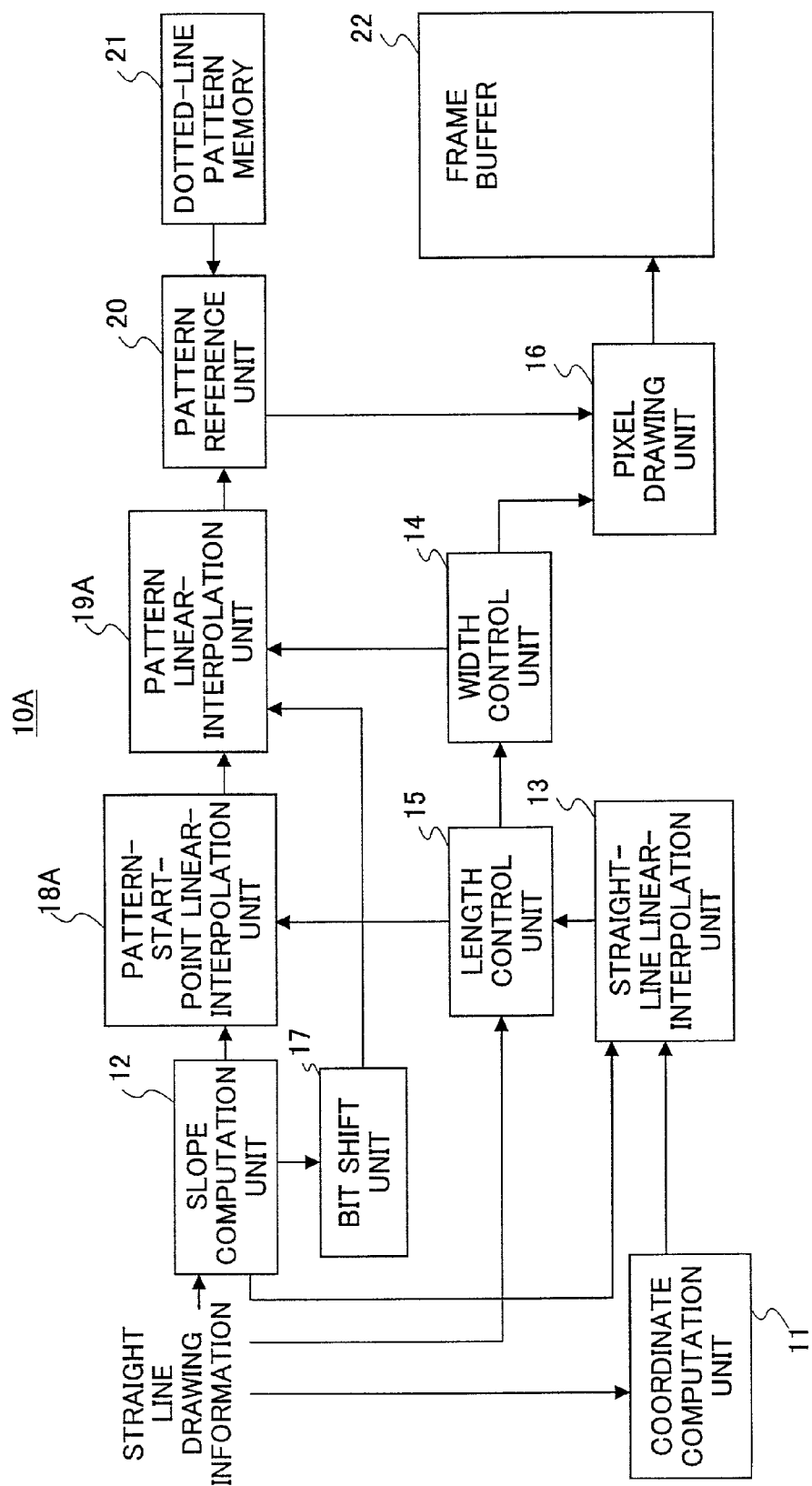
FIG. 6 is a block diagram showing a configuration of a second embodiment of an image drawing apparatus according to the present invention.

FIG. 6 is a block diagram showing a configuration of a second embodiment of an image drawing apparatus according to the present invention.

An image drawing apparatus 10A of FIG. 6 includes the coordinate computation unit 11, the slope computation unit 12, a straight-line linear-interpolation unit 13A, the width control unit 14, the length control unit 15, the pixel drawing unit 16, the bit shift unit 17, a pattern-start-point linear-interpolation unit 18A, a pattern linear-interpolation unit 19A, the pattern reference unit 20, the dotted-line pattern memory 21, and the frame buffer 22. In FIG. 6, the same elements as those of FIG. 2 are referred to by the same numerals.

Coordinates of a start point and an end point of a straight line to be drawn, a thickness of the straight line, etc., will be given as straight line drawing information. The coordinate computation unit 11 computes the coordinate addresses (i.e., an X address and a Y address) of a start point of a straight line based on the coordinates of the start point of the straight line to be drawn. The slope computation unit 12 computes the slope of the straight line to be drawn based on the coordinates of the start point and end point of the straight line. The straight-line linear-interpolation unit 13 adds incremental XY changes to the coordinate addresses of the start point of the straight line supplied from the coordinate computation unit 11 where the incremental XY changes match the slope of the straight line supplied from the slope computation unit 12. This provides XY addresses of successive points on the straight line to be drawn.

The length control unit 15 counts pixels up to the number that corresponds to the length of the straight line to be drawn based on the drawing information. Based on this count, the length control unit 15 makes the width control unit 14 operate a predetermined number of times, thereby drawing the predetermined number of horizontal lines successively one next to another, generating a straight line having a predetermined width and a predetermined length. The count information indicative of a current line in terms of how many lines have been drawn so far is supplied to the pattern-start-point linear-interpolation unit 18A.

Under the control of the length control unit 15 using the count thereof, the width control unit 14 counts pixels up to the number that corresponds to the width of the straight line to be drawn, i.e., the number that corresponds to the length of a horizontal line drawn by a scan in the actual scan direction. According to this count, the straight-line linear-interpolation unit 13A successively adds an incremental X change to the XY addresses of a dot on the straight line to be drawn, thereby computing the XY addresses of successive pixels on the horizontal line that is drawn by a scan in the actual scan direction. The computed XY addresses of pixels on the horizontal line to be drawn are supplied to the pixel drawing unit 16.

The bit shift unit 17 receives slope data from the slope computation unit 12, and shifts the slope data to the right by one bit, thereby generating data of half the slope. This generated data is supplied to the pattern linear-interpolation unit 19A.

The pattern-start-point linear-interpolation unit 18A outputs "n" as a pattern reference position of the start point of line drawing if the count supplied from the length control unit 15 indicates that the n-th line is to be drawn. The pattern reference position of the start point obtained in this manner is supplied to the pattern linear-interpolation unit 19A.

The pattern linear-interpolation unit 19 successively adds the data of half the slope to the start-point pattern reference position in response to the pixel count supplied from the width control unit 14. The outcome of this addition operation is converted into an integer through a rounding operation such as rounding to the nearest integer or rounding by counting a fraction under the decimal point as one, and is then supplied to the pattern reference unit 20. The pattern reference unit 20 reads a data piece of the dotted-line data from the specified reference address of the dotted-line pattern memory 21, and supplies the retrieved data to the pixel drawing unit 16.

The pixel drawing unit 16 performs drawing processing according to the dotted-line data supplied from the pattern reference unit 20 with respect to the pixel of specified XY addresses on the horizontal scan line supplied from the width control unit 14.

In this manner, the image drawing apparatus 10A according to the present invention successively draws horizontal lines to achieve high-speed drawing, and successively shifts the pattern reference position of each pixel on the current horizontal line in accordance with the slope when drawing a plurality of dotted lines having a vertical principal direction to generate a thick dotted line. This makes it possible to properly adjust the direction of broken edges of the dotted line in relation to the direction at which the dotted line extends, thereby generating a dotted line having natural appearance.

Figure 7:
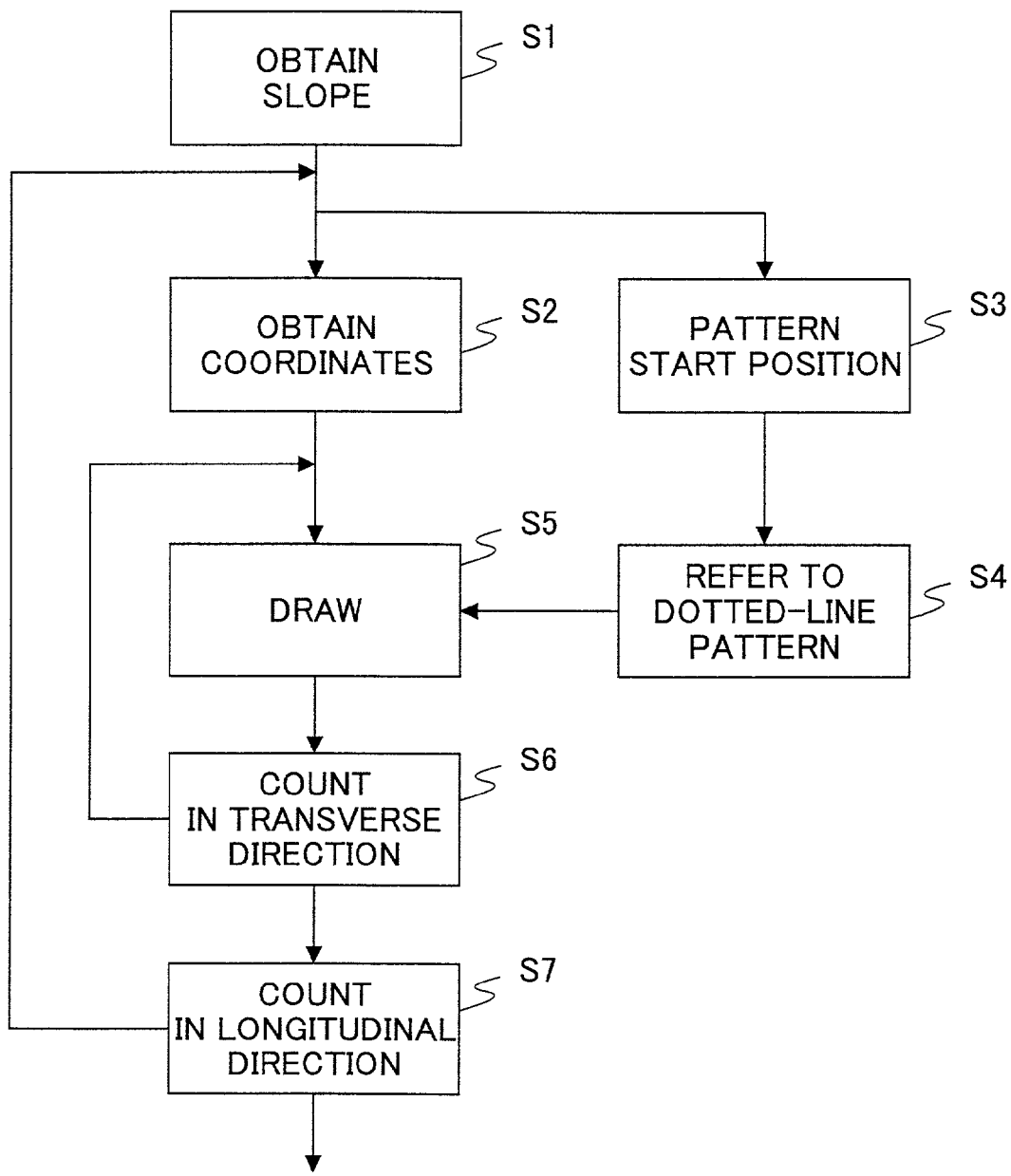
FIG. 7 is a flowchart showing a method of drawing a doted line performed by the image drawing apparatus of FIG. 6.

FIG. 7 is a flowchart showing a method of drawing a doted line performed by the image drawing apparatus 10A of FIG. 6. A count in the transverse direction and a count in the longitudinal direction are initialized to zero.

At step S1, the slope of a straight line to be drawn is computed from the coordinates of the start point and end point of the straight line.

At step S2, the coordinate addresses (i.e., an X address and a Y address) of the start point are computed from the coordinates of the start point of the straight line to be drawn, and incremental XY changes reflecting the slope of the straight line are successively added to generate XY addresses of successive points on the straight line to be drawn. These XY addresses mark the start points of the horizontal lines that are drawn by actual scans.

At step S3, the pattern reference position of a line drawing start point is set to "n" if the longitudinal-direction count (i.e., the count in the direction in which the dotted line having a vertical principal axis extends) is "n" indicating that the n-th horizontal line is to be drawn.

At step S4, the pattern reference position of a line drawing start point is subjected to successive and multiple addition of the data of half the slope, and the outcomes are converted into reference addresses by a rounding operation such as rounding to the nearest integer, rounding to an integer by counting a fraction under the decimal point as one, etc. Data of the dotted-line pattern are successively read from successive reference addresses.

At step S5, an incremental X change is successively added in response to the transverse-direction count by starting from the start point coordinate addresses, thereby identifying a dot on the horizontal line to be drawn and performing drawing processing according to the dotted-line pattern data.

At step S6, the transverse-direction count is incremented by one, and thereafter the procedure goes back to step S5. If the transverse-direction count corresponds to the width of the straight line having the vertical principal axis, the drawing of a horizontal line has come to an end, so that the procedure goes to step S7.

At step S7, the longitudinal-direction count is incremented by one, and the procedure goes back to step S2 and S3. If the longitudinal-direction count corresponds to the length of the straight line having the vertical principal axis, the drawing of the thick dotted line has come to an end, which marks an end of the image drawing procedure.

Figure 8:
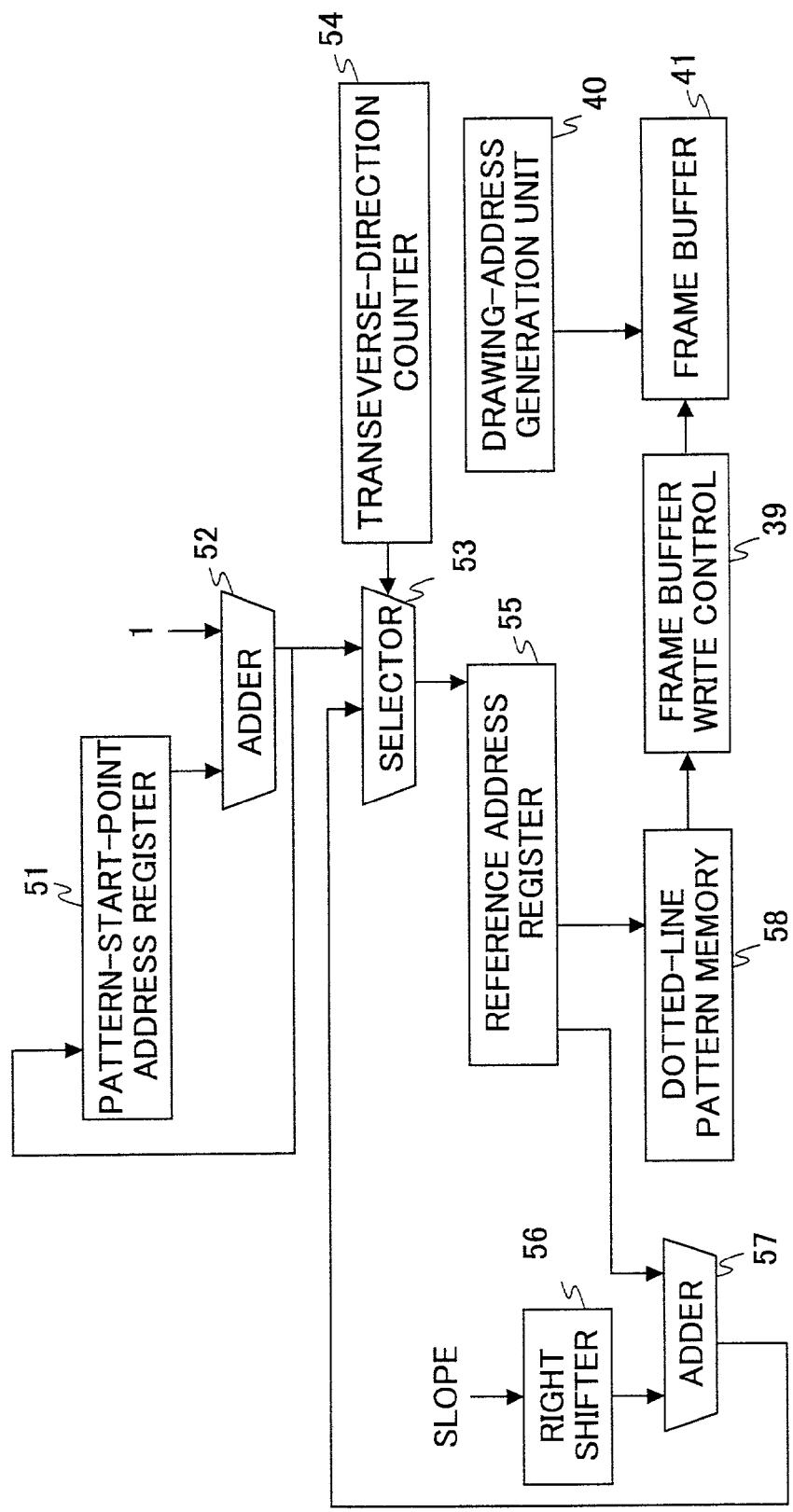
FIG. 8 is a block diagram showing a configuration of a portion of the image drawing apparatus of FIG. 6 that relates to the control of pattern reference positions.

FIG. 8 is a block diagram showing a configuration of a portion of the image drawing apparatus 10A that relates to the control of pattern reference positions. In FIG. 8, the same elements as those of FIG. 4 are referred to by the same numerals.

The configuration of FIG. 8 includes a pattern-start-point address register 51, an adder 52, a selector 53, a transverse-direction counter 54, a reference address register 55, a right shifter 56, an adder 57, the dotted-line pattern memory 38, the frame buffer write control 39, the drawing-address generation unit 40, and the frame buffer 41.

The pattern-start-point address register 51 stores "0" therein as an initial value thereof. The adder 52 adds "1" to the contents of the pattern-start-point address register 51, and stores an outcome of this addition operation in the pattern-start-point address register 51. This addition operation is performed each time the drawing of a new horizontal line through an actual scan starts after completing the drawing of the previous horizontal line. The pattern-start-point address register 51 and the adder 52 correspond to the pattern-start-point linear-interpolation unit 18A of FIG. 6.

The pattern reference position that is output from the adder 52 is supplied to the reference address register 55 through the selector 53 if the count of the transverse-direction counter 54 is "0". The reference address register 55 stores therein a real value, and serves to hold the supplied data of the pattern reference position as it is.

The right shifter 56 shifts the supplied data to the right by one bit, thereby generate the data of half the slope. The reference position stored in the reference address register 55 is incremented by half the slope by the adder 57, and is then supplied to the selector 53. If the count of the transverse-direction counter 54 is 1 or more, the selector 53 selects the outcome of addition by the adder 57, and supplies the outcome of addition to the reference address register 55 each time the count increases. In this manner, the reference position is successively increased from the pattern reference position of the drawing start point in response to the count of the transverse-direction counter 54.

The pattern reference positions generated in this manner are rounded off to integers, which are supplied as reference addresses from the reference address register 55 to the dotted-line pattern memory 38. This results in the dotted-line data being read one after another and supplied to the frame buffer write control 39. The frame buffer write control 39 performs drawing processing according to the supplied dotted-line data with respect to each pixel in the frame buffer 41 that corresponds to the drawing address supplied from the drawing-address generation unit 40.

In the description provided above, the first embodiment and the second embodiment have been described as separate embodiments. These embodiments, however, may be combined, such that the drawing method of the first embodiment is employed if the straight line to be drawn has a horizontal principal axis, and that the drawing method of the second embodiment is employed if the straight line to be drawn has a vertical principal axis. In this manner, the first embodiment and the second embodiment may be switched in response to the slope of the straight line to be drawn.

A configuration of an image drawing apparatus of this scheme may have both the configuration of the first embodiment and the configuration of the second embodiment, but those units which overlap between FIG. 2 and FIG. 6 or between FIG. 4 and FIG. 8 may not be provided in duplicate so as to facilitate shared use thereof. This configuration can achieve high-speed drawing processing without incurring an excessive increase in circuitry size.

Further, the present invention is not limited to these embodiments, but various variations and modifications may be made without departing from the scope of the present invention.

The present application is based on Japanese priority application No. 2001-172920 filed on Jun. 7, 2001, with the Japanese Patent Office, the entire contents of which are hereby incorporated by reference.

What is claimed is:

1. An apparatus for drawing a dotted line having a width wider than that of a single line, said width being achieved by drawing a plurality of straight lines side by side in a number corresponding to the width, the apparatus comprising:
   a memory configured to store therein data of a dotted-line pattern that includes a series of data pieces stored at respective reference positions, each of the data pieces indicating an on/off state of a corresponding pixel;
   a unit configured to identify successive pixels on a straight line to be drawn with respect to each line of the plurality of drawn straight lines;
   a pattern reference unit configured to refer to the data of a dotted-line pattern while changing a reference address for accessing a corresponding one of the data pieces, the reference address being incremented one by one when drawing the successive pixels on the straight line to be drawn, and the reference address for accessing a data piece corresponding to a first one of the successive pixels being responsive to a slope of the dotted line and a position of the straight line to be drawn among the plurality of straight lines; and
   a drawing unit which draws said successive pixels with respect to each line of the plurality of straight lines in response to the data of a dotted-line pattern referred to by said pattern reference unit.

2. The apparatus as claimed in claim 1, wherein said pattern reference unit refers to the data of a dotted-line pattern by determining a reference address of a start point of line drawing as being specific to each line of said plurality of straight lines according to the slope and by successively shifting the determined reference address by one address.

3. The apparatus as claimed in claim 2, further comprising:
   a width control unit which counts each line of said plurality of straight lines;
   a length control unit which counts said successive pixels on the straight line to be drawn;
   a linear interpolation unit which obtains a reference position of a start point of line drawing as being specific to each line of said plurality of straight lines according to the slope in response to the count by said width control unit, and rounds off the reference position to an integer to obtain said reference address of a start point of line drawing, followed by obtaining reference addresses of subsequent pixels following the start point in response to the count made by said length control unit.

4. The apparatus as claimed in claim 3, wherein said linear interpolation unit obtains the reference position of a start point of line drawing as being specific to each line of said plurality of straight lines by successively adding a half of the slope to the reference position of a start point of line drawing of a first straight line of said plurality of straight lines, wherein another half of the slope is added to the reference position of the start point of a line immediately preceding a previously drawn line of said plurality of straight lines.

5. The apparatus as claimed in claim 1, wherein said pattern reference unit refers to the data of a dotted-line pattern by starting from a reference address of a start point of line drawing that is shifted one by one each time a new line of the plurality of straight lines is to be drawn, and by successively shifting the reference address according to the slope.

6. The apparatus as claimed in claim 5, further comprising:
   a first control unit which counts each line of said plurality of straight lines;
   a second control unit which counts said successive pixels on the straight line to be drawn;
   a linear interpolation unit which obtains a reference position of a start point of line drawing that is shifted one by one as being specific to each line of said plurality of straight lines in response to the count by said first control unit, and successively shifting a reference position starting from the reference position of a start point of line drawing according to the slope in response to the count made by said second control unit, followed by rounding off the shifted reference position to an integer to obtain the reference address.

7. The apparatus as claimed in claim 6, wherein said linear interpolation unit obtains the shifted reference position by successively adding a half of the slope to the reference position of a start point of line drawing, wherein another half of the slope is added to the reference position of the start point of a line immediately preceding a previously drawn line of said plurality of straight lines.

8. The apparatus as claimed in claim 5, further comprising a frame memory having addresses in a horizontal direction and addresses in a vertical direction and storing drawing data therein at specified addresses, wherein said dotted line has a principal axis thereof extending in said vertical direction.

9. A method of drawing a dotted line having a width wider than that of a single line, said width being achieved by drawing a plurality of straight lines side by side in a number corresponding to the width, comprising:
   storing data of a dotted-line pattern in memory that includes a series of data pieces stored at respective reference positions, each of the data pieces indicating an on/off state of a corresponding pixel;
   identifying successive pixels on a straight line to be drawn with respect to each line of the plurality of drawn straight lines;
   referring to the data of a dotted-line pattern while changing a reference address for accessing a corresponding one of the data pieces, the reference address being incremented one by one when drawing the successive pixels on the straight line to be drawn, and the reference address for accessing a data piece corresponding to a first one of the successive pixels being responsive to a slope of the dotted line and a position of the straight line to be drawn among the plurality of straight lines;
   drawing said successive pixels with respect to each line of the plurality of straight lines in response to the data of a dotted-line pattern that is referred to at said step of referring to the data of a dotted-line pattern.

10. The method as claimed in claim 9, wherein the referring to the data of a dotted-line pattern changes the reference address by successively adding a half of the slope of the dotted line, wherein another half of the slope is added to the reference position of a beginning of a line immediately preceding a previously drawn line of said plurality of straight lines.

* * * * *